(12) United States Patent
Zhao et al.

(10) Patent No.: US 9,906,254 B2
(45) Date of Patent: Feb. 27, 2018

(54) FACILITATING MULTIPLE SUBSCRIBER IDENTITY SUPPORT IN A WIRELESS DEVICE

(71) Applicant: Apple Inc., Cupertino, CA (US)

(72) Inventors: Wen Zhao, San Jose, CA (US); Arun g Mathias, Los Altos, CA (US); Syed a Mujtaba, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 245 days.

(21) Appl. No.: 13/803,222

(22) Filed: Mar. 14, 2013

(65) Prior Publication Data
US 2014/0228039 A1    Aug. 14, 2014

Related U.S. Application Data

(60) Provisional application No. 61/763,162, filed on Feb. 11, 2013.

(51) Int. Cl.
*H04B 1/38*     (2015.01)
*H04W 8/18*    (2009.01)
(Continued)

(52) U.S. Cl.
CPC ......... *H04B 1/3816* (2013.01); *H04B 1/0064* (2013.01); *H04W 8/183* (2013.01);
(Continued)

(58) Field of Classification Search
CPC ... H04W 88/06; H04W 76/025; H04W 48/18; H04W 8/183; H04W 72/1215;
(Continued)

(56) References Cited

U.S. PATENT DOCUMENTS 7,535,866 B2 *   5/2009   Kimble et al. ................. 370/328
2003/0235167 A1 *  12/2003  Kuffner .......................... 370/335
(Continued)

FOREIGN PATENT DOCUMENTS

CN     101827464 A    9/2010
EP       2515593       10/2012
(Continued)

OTHER PUBLICATIONS

PCT Application No. PCT/US2014/014802—International Search Report & Written Opinion dated Sep. 2, 2014.
(Continued)

*Primary Examiner* — Nathan Mitchell
(74) *Attorney, Agent, or Firm* — Downey Brand LLP (57) ABSTRACT

Facilitating multiple subscriber identity support in a wireless user equipment (UE) device. A UE may include or be coupled to multiple subscriber identity modules (SIMs). The UE may be configured to perform cellular communications with a first cellular network using a first subscriber identity provided by a first SIM. The UE may also be configured to perform cellular communications with a second cellular network using a second subscriber identity provided by a second SIM. The cellular communications with the first cellular network and the second cellular network may be performed concurrently using shared radio resources.

20 Claims, 5 Drawing Sheets

(51) Int. Cl.
*H04W 8/20* (2009.01)
*H04W 48/18* (2009.01)
*H04W 60/00* (2009.01)
*H04W 68/00* (2009.01)
*H04W 72/12* (2009.01)
*H04B 1/3816* (2015.01)
*H04W 16/02* (2009.01)
*H04W 88/06* (2009.01)
*H04B 1/00* (2006.01)
*H04W 68/02* (2009.01)

(52) U.S. Cl.
CPC ........... *H04W 16/02* (2013.01); *H04W 48/18* (2013.01); *H04W 68/02* (2013.01); *H04W 88/06* (2013.01); *H04W 8/205* (2013.01); *H04W 60/005* (2013.01); *H04W 68/00* (2013.01); *H04W 72/1215* (2013.01)

(58) Field of Classification Search
CPC ... H04W 8/205; H04W 68/00; H04W 60/005; H04B 1/3816
USPC .......................................................... 455/450
See application file for complete search history.

(56) References Cited

U.S. PATENT DOCUMENTS

| | | | | |
|---|---|---|---|---|
| 2006/0089117 A1* | 4/2006 | Suzuki | ............ | 455/269 |
| 2006/0282518 A1* | 12/2006 | Karaoguz et al. | ............ | 709/221 |
| 2009/0312020 A1* | 12/2009 | Lee | ............ | 455/435.2 |
| 2009/0325572 A1* | 12/2009 | Ji | ............ | H04W 24/06 455/424 |
| 2010/0279709 A1* | 11/2010 | Shahidi et al. | ............ | 455/456.2 |
| 2010/0317403 A1 | 12/2010 | Mizuo | | |
| 2012/0108206 A1* | 5/2012 | Haggerty | ............ | H04W 12/06 455/411 |
| 2012/0108294 A1* | 5/2012 | Kaul | ............ | 455/558 |
| 2012/0135715 A1* | 5/2012 | Kang et al. | ............ | 455/412.1 |
| 2012/0182938 A1 | 7/2012 | Mujtaba et al. | | |
| 2012/0231802 A1 | 9/2012 | Ngai | | |
| 2012/0260086 A1 | 10/2012 | Haggerty et al. | | |
| 2012/0264473 A1* | 10/2012 | Mujtaba et al. | ............ | 455/515 |
| 2012/0289193 A1 | 11/2012 | Bergenwall | | |
| 2013/0012135 A1* | 1/2013 | Ruohonen | ............ | H04B 1/406 455/63.1 |
| 2013/0065644 A1* | 3/2013 | Bishop et al. | ............ | 455/558 |
| 2013/0196621 A1* | 8/2013 | Guday et al. | ............ | 455/406 |
| 2013/0310108 A1* | 11/2013 | Altman | ............ | 455/552.1 |
| 2014/0038671 A1* | 2/2014 | Christensen et al. | ............ | 455/558 |
| 2014/0213235 A1* | 7/2014 | Lou | ............ | H04B 15/04 455/418 |
| 2014/0342715 A1* | 11/2014 | Gu | ............ | G06F 9/455 455/418 |

FOREIGN PATENT DOCUMENTS

| | | |
|---|---|---|
| GB | 2485433 | 5/2012 |
| JP | 2009-055325 A | 3/2009 |
| JP | 2012-109973 A | 6/2012 |

OTHER PUBLICATIONS

Taiwanese Patent Application No. 103104472—Office Action dated May 28, 2015.
Japanese Office Action, JP Application No. 2015-557010 dated Jun. 30, 2016 (4 pages).
Chinese Patent Application No. 201480008099.8—First Office Action dated Nov. 27, 2017.

* cited by examiner

FACILITATING MULTIPLE SUBSCRIBER IDENTITY SUPPORT IN A WIRELESS DEVICE

PRIORITY CLAIM

The present application claims benefit of priority to U.S. Provisional Application No. 61/763,162 titled "Facilitating Multiple Subscriber Identity Support in a Wireless Device" and filed on Feb. 11, 2013, whose inventors are Wen Zhao, Arun G Mathias, and Syed A Mujtaba, which is hereby incorporated by reference in its entirety as though fully and completely set forth herein.

FIELD

The present disclosure relates to the field of wireless communication, and more particularly to a system and method for generating an embedded subscriber identity module (eSIM) from a removable SIM and for simultaneously utilizing multiple subscriber identities in a user equipment (UE) device.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1 xRTT, 1×EV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, then, it may often be desirable to provide the ability for a device to communicate using multiple wireless technologies or standards. In some cases, this may be accomplished by providing separate functional blocks for each wireless communication technology or standard in a device. However, this may incur additional costs associated with the device due to more (and in some cases duplicate) components being required, and may introduce inefficiencies in device operation (e.g., greater power requirements due to multiple radios, interference between radios adversely affecting each other). This may also adversely affect the form factor of the device, especially if the device is a mobile device for which a smaller (e.g., slimmer, lighter) form factor may be desirable.

Furthermore, in order to enable a wireless device to access a wireless communication network (e.g., a cellular telecommunication network) according to at least some wireless communication technologies and standards, a user may be required to subscribe to a service provider (a "carrier"), who in turn may provide such services to the user, e.g., via a wireless communication network which they operate. Such subscribers in a wireless communication network are typically assigned subscriber identity information, which may for example be stored as part of a subscriber identity module (SIM) in the subscriber's wireless device. For example, many wireless devices may be provided with a slot for a removable subscriber identity module (SIM) card. Providing such a slot may enable users to select and/or change their subscriber identity independently from the wireless device, as the user may be able to switch out their current SIM card for a different SIM card at any given time as desired.

Since removable SIM cards typically provide a single subscriber identity, providing a single SIM slot usually limits a wireless device to use of a single subscriber identity at a particular time. While it may be possible to provide multiple SIM slots in a device, this may increase hardware complexity and/or cost, and still generally limits the maximum number of SIMs available on the device to the number of SIM slots. It may also be possible to utilize a SIM card which provides multiple subscriber identities, but this type of solution may significantly limit flexibility, e.g., by limiting possible subscriber identity combinations to those available on a single SIM. Furthermore, even if multiple SIM slots or a SIM card which provides multiple subscriber identities are utilized in a device, the device may still typically be limited to use of a single subscriber identity at any given time; in other words, such techniques may not inherently provide a device with the ability to simultaneously or concurrently utilize the multiple subscriber identities. This may limit the device's geographic range (e.g., given differing service areas provided by different carriers), functionality (e.g., if different carriers provide service according to different wireless communication technologies), and/or otherwise negatively impact the utility of the device. Accordingly, improvements in wireless communications, and particular with respect to subscriber identity support and functionality, would be desirable.

SUMMARY

In light of the foregoing and other concerns, it would be desirable to expand the functionality of wireless devices with respect to subscriber identities. In particular, it would be desirable to provide a way for a device to utilize multiple subscriber identities, preferably in a user-friendly manner which does not require complicated and/or costly hardware modifications. The present disclosure relates to such techniques for facilitating multiple subscriber identity support in a wireless device according to various embodiments.

As one example of such a technique, by providing a way to generate an embedded SIM (eSIM) on a wireless device from a removable SIM card which is inserted into that device, users may be provided with increased flexibility with respect to which and how many SIMs are present on their wireless device at any given time. Flexibility and functionality may further be increased by providing a way for the device to store and use any combination of SIMs from one or more eSIMs (which may be pre-provisioned or generated from removable SIM cards) and/or one or more removable SIM cards (e.g., depending on the hardware configuration of the device).

Moreover, at least in some cases device performance and/or functionality may be improved by enabling the device to operate according to multiple subscriber identities simultaneously or concurrently. While such simultaneous or concurrent operation may be possible using multiple independent functional blocks, it may further be desirable to support communication using multiple subscriber identities with radio resources which are shared between the subscriber identities. For example, in contrast to a device which uses separate functional blocks (e.g., separate radios) to support multiple subscriber identities and/or implement different wireless communication technologies, an alternative might include a device which uses a single functional block (e.g., a single radio) to support multiple subscriber identities and/or implement multiple wireless communication technologies. Such a device could potentially have a lower manufacturing cost (e.g., due to fewer required components and/or simpler overall architecture) and more efficient operation (e.g., due to lower power requirements for the single radio). Additionally, such a single radio design may readily allow for a more desirable form factor (e.g., slimmer, lighter) of the device itself. Thus, certain aspects of the present disclosure further relate to techniques for multiplexing (sharing) radio resources (such as one or more antennas) between different subscriber identities, thereby enabling a device to simultaneously or concurrently monitor networks corresponding to each of multiple subscriber identities.

Embodiments of the disclosure may thus be directed to methods for generating an eSIM from a removable SIM and for concurrently or simultaneously supporting multiple subscriber identities in a wireless user equipment (UE) device, to a UE device configured to implement such a method, and/or to a non-transitory computer accessible memory medium storing program instructions executable by a processor to implement such a method. The UE device may include a radio (e.g., including one or more antennas and/or other radio components) for performing wireless communication. The UE device may also include a processing element configured to implement part or all of the method (e.g., by executing program instructions). The UE device may further include one or more user interface elements, such as a display. In addition, the UE device may include a non-transitory computer accessible memory medium, which may store program instructions executable by the UE.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
LTE-A: LTE-Advanced
SIM: Subscriber Identity Module
eSIM: Embedded SIM
IMSI: International Mobile Subscriber Identity
MCC: Mobile Country Code
MNC: Mobile Network Code Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
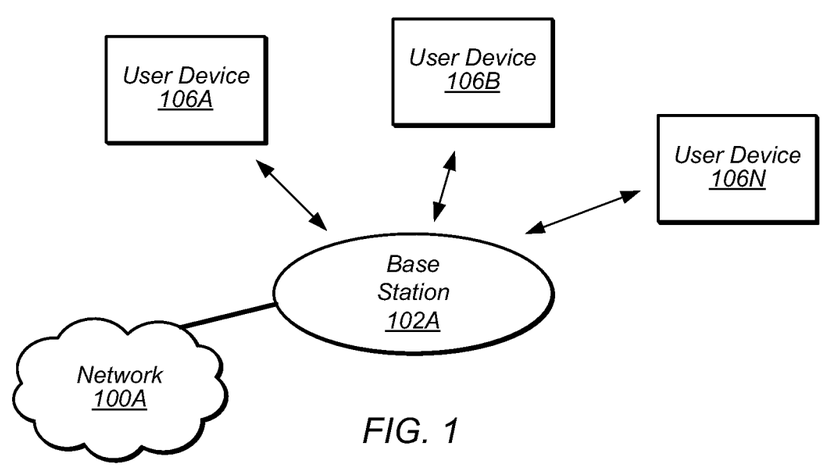
FIGS. 1-2 illustrate exemplary wireless communication systems.
Figure 2:
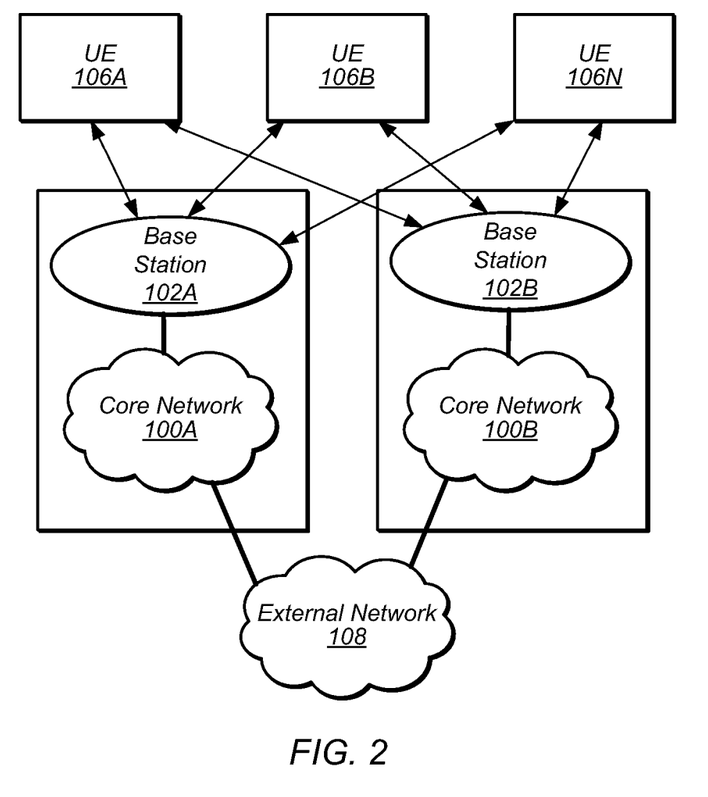
Figure 3:
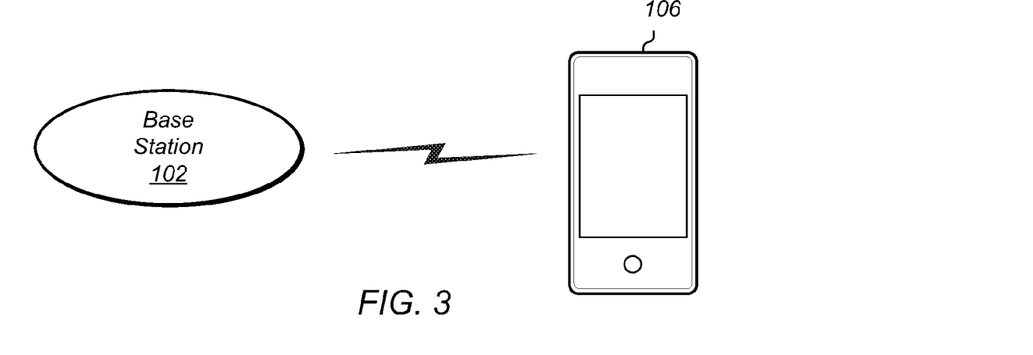
FIG. 3 illustrates an exemplary base station in communication with an exemplary user equipment device.

FIGS. 1-3—Communication System

FIGS. 1 and 2 illustrate exemplary (and simplified) wireless communication systems. It is noted that the systems of FIGS. 1 and 2 are merely examples of certain possible systems, and embodiments may be implemented in any of various systems, as desired.

The exemplary wireless communication system of FIG. 1 includes a base station 102A which communicates over a transmission medium with one or more user devices 106A, 106B, etc., through 106N. Each of the user devices may be referred to herein as a "user equipment" (UE). Thus, the user devices are referred to as UEs or UE devices. In the exemplary wireless communication system of FIG. 2, in addition to the base station 102A, base station 102B also (e.g., simultaneously or concurrently) communicates over a transmission medium with the user devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (base station 102A may be coupled to core network 100A, while base station 102B may be coupled to core network 100B), which may be a core network of a cellular service provider. Each core network 100 may also be coupled to one or more external networks (such as external network 108), which may include the Internet, a Public Switched Telephone Network (PSTN), or any other network. Thus, the base station 102A may facilitate communication between the user devices and/or between the user devices and the network 100A; in the exemplary system of FIG. 2, the base station 102B may also facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the exemplary network configuration shown in FIG. 1, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies)

might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the user devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-DCMA, TD-SCDMA, etc.), CDMA2000 (1×RTT, 1×EV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either (or both) of GSM or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or GSM, and separate radios for communicating using each of Wi-Fi and Bluetooth. Other configurations are also possible.

Figure 4:
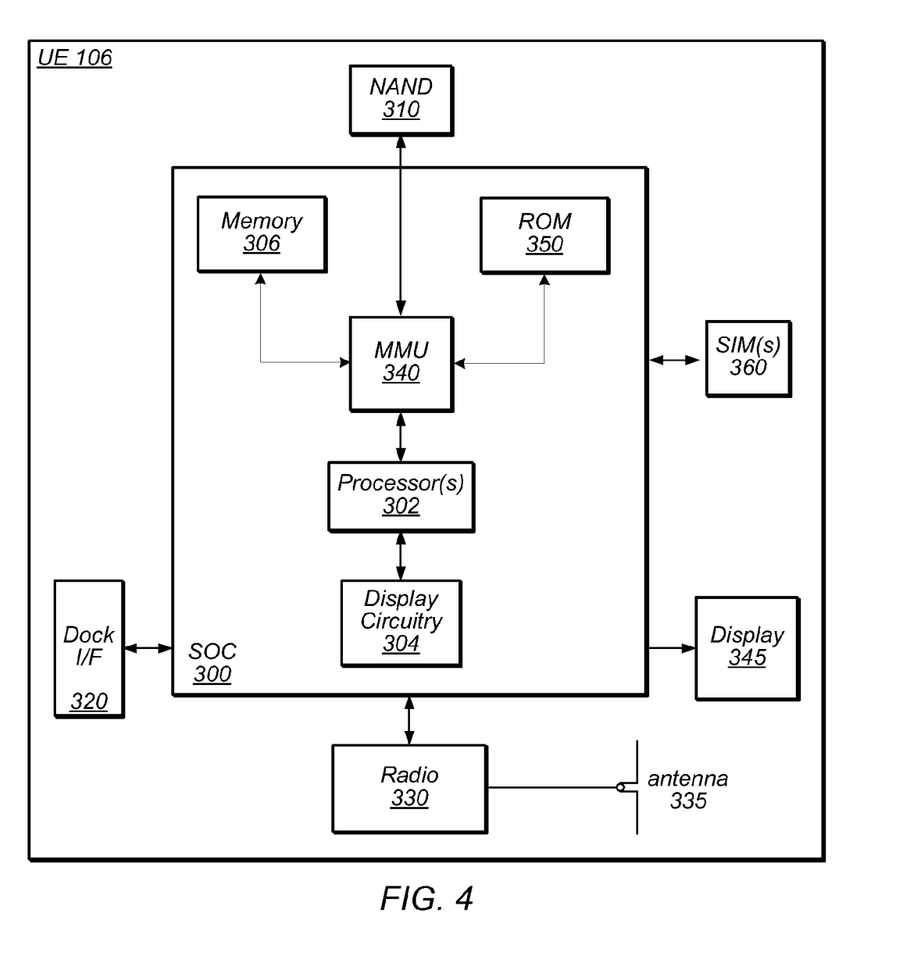
FIG. 4 illustrates an exemplary block diagram of a user equipment device.

FIG. 4—Exemplary Block Diagram of a UE

FIG. 4 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 345, and wireless communication circuitry 330 (e.g., for GSM, UMTS, LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more buttons, sliders, and/or dials, and/or any of various other elements capable of providing information to a user and/or receiving/interpreting user input.

As shown, the UE 106 may also include one or more subscriber identity modules (SIMs) 360. A SIM 360 may be implemented as an application on a smart card, in some embodiments. The smart card may itself be referred to as a SIM card in some cases. As one example, a SIM 360 may be an application which executes on a Universal Integrated Circuit Card (UICC). The smart card may also include (e.g., store and/or execute) one or more other applications, if desired. The smart card may be removable.

Alternatively, or in addition, a SIM 360 may be implemented as an embedded SIM (eSIM). In this case, the SIM 360 may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 306 or NAND 310) executing on a processor (such as processor 302) in the UE 106. As described further subsequently herein with respect to FIG. 6, the UE 106 may be configured to generate an eSIM from a removable SIM card.

A SIM 360 may include a number of types of information, including personalized information specific to a user and/or device (e.g., personalized information), and information that is not specific to a user and/or device (e.g., common information). The common portion may include files, data structures, and/or applications that may be common among some or all types of SIMs (e.g., among UICCs/eUICCs of the same profile). The personalized information may include user/unit specific data, for example information identifying the user/unit to their carrier's network, personalized authorization and/or security information, etc. Some or all of the personalized information may be used as a subscriber identity for the UE 106, for example in order to identify the UE 106 to a carrier's network and to obtain cellular service from the carrier.

As one example, the personalized information may include one or more International Mobile Subscriber Identity (IMSI) numbers. An IMSI may identify the subscriber to their carrier's network. The IMSI may, for example, be a number including the subscriber's "home" mobile country code (MCC) and mobile network code (MNC), as well as a Mobile Subscription Identification Number (MSIN) which is unique to the subscriber. The personalized information may also or alternatively include a personal identification number (PIN) (e.g., a code which the user may use to access their SIM), a personal unblocking code and/or personal unblocking key (PUC/PUK), and one or more authentication keys (K/Ki). Any of a variety of other personalized information may also or alternatively be used, as desired.

As noted above, the subscriber identity information may be used to identify the UE 106 to its subscriber's carrier cellular network. A single subscriber identity may accordingly be suitable in many cases if a user is satisfied with their carrier's cellular network and service plan. However, in many cases, it may be desirable for a user to utilize multiple subscriber identities. For example, a user may consider it desirable to obtain service from multiple carriers for any of a variety of reasons, including differeing footprints/service areas of different carriers, different service plans/pricing offered by different carriers, or different technologies used.

In some cases it may be desirable to utilize multiple subscriber identities (whether from the same or different carriers) as a means of differentiating types of interactions, such as work-related communications and personal communications.

As a further possibility, a situation might arise in which it might be desirable to utilize multiple subscriber identities in a single device for some carriers which implement LTE networks. In particular, in many cases an LTE (e.g., as a packet-switched communication technology) network may be (at least initially) deployed for data communications (e.g., web browsing, email and other networking applications, etc.), while a (e.g., pre-existing) GSM and/or UMTS (e.g., which may include circuit-switched communication technologies) network may be utilized provided for voice communications.

In order to provide such hybrid functionality using a single subscriber identity, circuit-switched fallback (CSFB) techniques may be implemented. Such techniques may include primarily monitoring and communicating via the LTE network, but 'falling back' to the GSM or UMTS network if an incoming voice call is received or an outgoing voice call is placed. This may require releasing a connection with the LTE network, and then establishing a connection to the GSM or UMTS network, in order to place or receive a voice call. Such a process may add a considerable delay (e.g., several seconds) to the call setup process, which may be burdensome to users.

Utilizing multiple subscriber identities may provide a device with an alternative to such techniques, provided the device is capable of utilizing multiple subscriber identities at the same time. In particular, if one SIM is designated for the voice RAT (e.g., GSM or UMTS) and a second SIM is designated for the data RAT (e.g., LTE), a device may be able to monitor both the carrier's GSM (or UMTS) network and the carrier's LTE network simultaneously. Thus, in such a case, incoming or outgoing calls may be received or placed directly on the GSM (or UMTS) network without requiring the CSFB delay which would otherwise be necessary.

As further described below, various other advantages may also result from providing means for conveniently obtaining and utilizing multiple subscriber identities in a wireless device. Accordingly, as described further subsequently herein, the UE 106 may include hardware and software components for implementing a method for generating eSIMs from removable SIM cards and for simultaneously utilizing multiple subscriber identities.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 5:
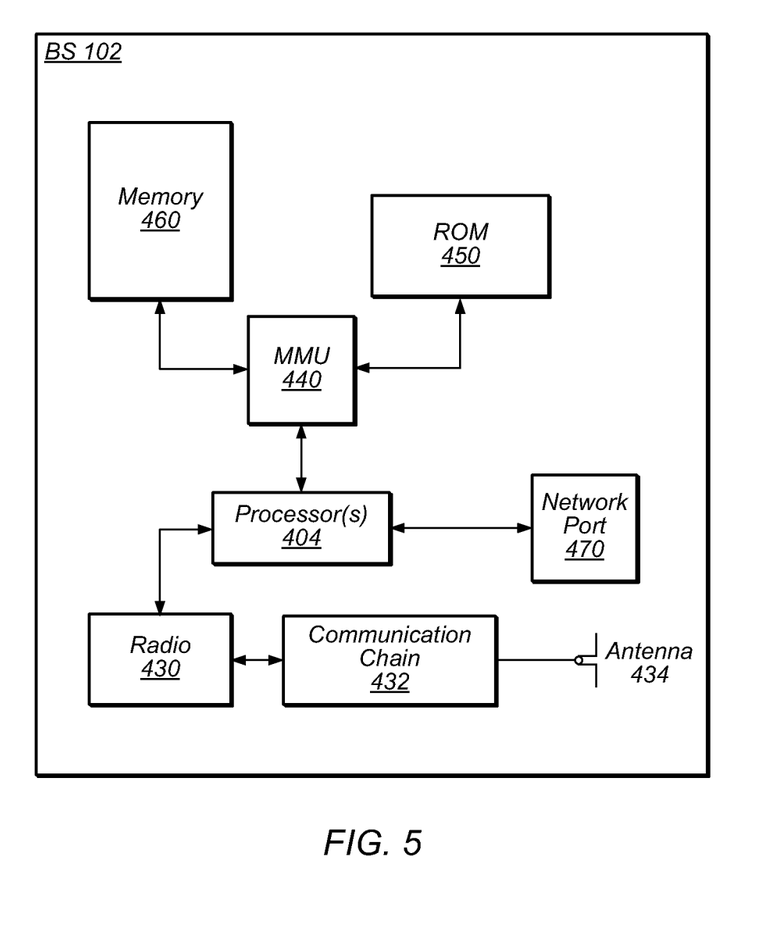
FIG. 5 illustrates an exemplary block diagram of a base station.

FIG. 5—Exemplary Block Diagram of a Base Station

FIG. 5 illustrates an exemplary block diagram of a base station 102. It is noted that the base station of FIG. 5 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 6:
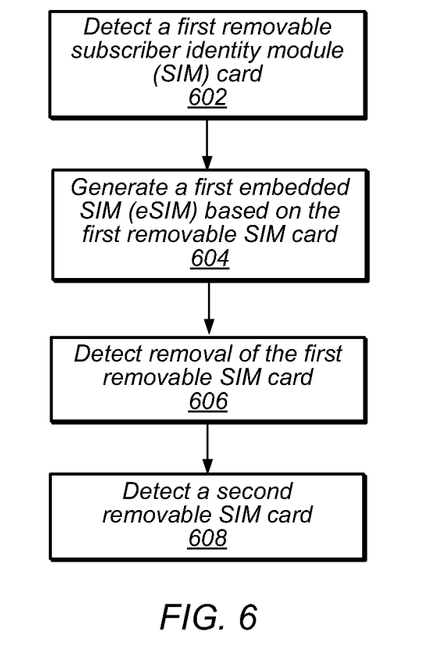
FIGS. 6-7 are flowchart diagrams illustrating exemplary methods for generating an eSIM from a removable SIM and for concurrently monitoring multiple networks utilizing multiple subscriber identities in a user equipment device.
Figure 7:
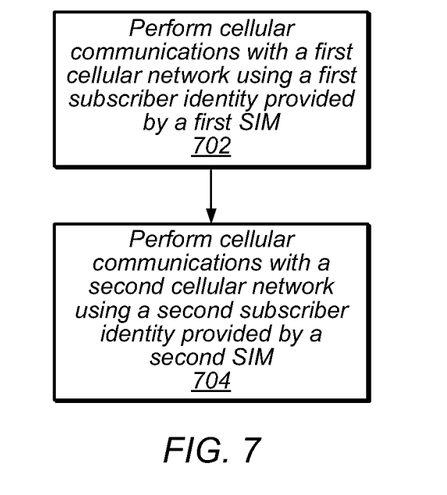

FIGS. 6-7—Flowcharts

As previously noted, it may be desirable for a user equipment (UE) device to utilize multiple subscriber identities, and to provide a flexible and user-friendly way of obtaining/storing those subscriber identities. FIG. 6 is a flowchart diagram illustrating a method for generating an eSIM from a removable SIM; FIG. 7 is a flowchart diagram illustrating a method for concurrently or simultaneously utilizing multiple SIMs in a UE device.

The methods shown in FIGS. 6 and 7 may be used in conjunction with any of the systems or devices shown in the above Figures, among other devices. Further, the methods shown in FIGS. 6 and 7 may be used individually or in combination, as desired. In various embodiments, some of the method elements shown may be performed concurrently, in a different order than shown, or may be omitted. Note also that additional method elements may also be performed as desired.

In 602, it may be detected that a first removable subscriber identity module (SIM) card is operatively coupled to the UE. The first removable SIM card may be coupled to the UE via a SIM slot provided as part of the UE, which may be configured for convenient insertion (coupling) and/or removal (de-coupling) of removable SIM cards. The first removable SIM card may be any of a variety of types of removable SIM card, including various sized (e.g., micro, nano) SIM cards, and may provide one or more subscriber identities corresponding to one or more cellular service providers (or "carrier") and/or one or more cellular communication technologies. For example, the first removable SIM card might include a subscriber identity configured to enable the UE to obtain cellular service from a first carrier according to a first radio access technology, such as LTE.

Based on detecting that the first removable SIM card is coupled to the UE, the UE may provide a prompt via a user interface. The prompt may request user feedback indicating whether or not to generate an embedded SIM from the first removable SIM card. The UE may also be configured to receive user input (e.g., again via the user interface) indicating whether or not to generate an eSIM based on the first removable SIM in response to the prompt.

Alternatively (or in addition), the UE may be configured to include one or more configuration settings menus, accessible via menu navigation, in which one or more user input options for generating an eSIM from the first removable SIM are provided. As another possibility, the UE may be responsive to prompted or unprompted voice commands requesting eSIM generation from the first removable SIM. In general, the UE may be configured to provide any of numerous means of receiving (prompted or unprompted) user input requesting (and/or indicating a preference not) to generate an eSIM from the first removable SIM, including via any of a variety of types of user interface/user interface elements, such as any of the various user interface elements described hereinabove with respect to FIG. 4.

As a further possibility, the UE may be configured to automatically generate an eSIM from the first removable SIM based on/in response to detecting insertion of the first removable SIM, if desired.

If user input indicating a request to generate an eSIM from the first removable SIM is received (or if the UE is configured to automatically do so), in 604 a first eSIM may be generated based on the first removable SIM card. Generating the first eSIM may include copying subscriber identity information from the first removable SIM card and storing that subscriber identity information on the UE. The subscriber identity information may be stored, for example, on an embedded hardware device dedicated for SIM usage, such as an eUICC, or in general purpose memory, or in any of various other locations on the UE. If desired, different portions of the subscriber identity information may be stored in different locations on the UE.

Note that the first eSIM may be configured to provide a subscriber identity (a "first subscriber identity") for use by the UE, which may be equivalent to (e.g., may include the same subscriber identity information and may be recognizable by a cellular network (a "first network") of a carrier (a "first carrier") corresponding to the subscriber identity) a subscriber identity provided by the first removable SIM card. Thus, generating and storing the first eSIM may effectively enable the UE to operate according to a subscriber identity provided by the first removable SIM card even after the first removable SIM card has been removed (de-coupled from) the UE.

The UE may accordingly be able to monitor the first network and perform cellular communications using the first subscriber identity provided by the first eSIM. Note that in some cases, the first eSIM may be registered with, updated by, and/or provisioned by the first carrier (the cellular service provider corresponding to the first subscriber identity) prior to (or as part of) monitoring and/or performing cellular communications via the first network. This may be an over-the-air process (e.g., performed via cellular communication) or a different type of process (e.g., performed via Wi-Fi, Bluetooth, near field communication (NFC), USB, etc.). Any of a variety of steps may be performed in order to register a UE/subscriber identity combination with a carrier. For example, the UE may scan frequencies (e.g., channels) within a certain operating range for networks.

Upon discovering a network corresponding to the subscriber identity, the UE device may identify itself to the network (e.g., using the selected subscriber identity) and negotiate for service. Once the network has determined that the subscriber identity is authorized to use the network (which may be determined at least in part based on the subscriber identity of the UE), the UE may be registered and may be given full (or partial, e.g., depending on the service agreement, communication technology, network arrangement, etc.) communication (e.g., voice and/or data) capability with the network. Other steps may alternatively or additionally be performed in registering the UE with the network, depending on the implementation, as will be apparent to those skilled in the art in light of this disclosure.

In 606 (e.g., once the first eSIM has been generated from the first removable SIM card), the first removable SIM card may be removed (e.g., by a user, or possibly automatically ejected upon completion of generation of the eSIM), and the UE may detect that the first removable SIM card is de-coupled from the UE. As noted above, the UE may be able to monitor the first network and perform cellular communications using the first subscriber identity provided by the first eSIM even after the first removable SIM card is no longer coupled to the UE.

In 608, it may be detected that a second removable SIM card is operatively coupled to the UE. The second removable SIM card may be inserted into the same SIM slot (or otherwise coupled in the same way) by which the first removable SIM card was previously operatively coupled to the UE. Alternatively (e.g., if the UE has multiple SIM slots), the second removable SIM card may be inserted into a different SIM slot or coupled to the UE in a different manner. The second removable SIM card may provide a different subscriber identity (a "second subscriber identity") than the first subscriber identity provided by the first removable SIM card and the first eSIM. The second subscriber identity may support access to a cellular network (a "second network") of a carrier (a "second carrier") corresponding to the second subscriber identity. The second carrier may be the same carrier as or a different carrier than the first carrier. Furthermore, the second network may be same network as the first network (e.g., if the second carrier is the same as the first carrier) or a different network. Still further, the first network and the second network may utilize the same or different radio access technologies (RATs).

The UE may also be configured to monitor the second network and perform cellular communications using the second subscriber identity provided by the second removable SIM card. Similar to the first eSIM, the second removable SIM card may be registered with, updated by, and/or provisioned by the second carrier (the cellular service provider corresponding to the second subscriber identity) prior to (or as part of) monitoring and/or performing cellular communications via the second network. This may be an over-the-air or any other type of process, and may be similar to or different than the process by which the first eSIM is registered/updated/provisioned (if such a step is indeed performed).

Note that (as described further with respect to FIG. 7) the UE may be configured to monitor the first network and the second network concurrently or simultaneously in some cases. Alternatively (e.g., if the UE has limited radio resources and/or is not configured for dynamic sharing between multiple subscriber identities), the UE may be configured to monitor either the first network or the second network, e.g., using either the first subscriber identity or the second subscriber identity, at any given time. For example, one of the subscriber identities (e.g., the first or second subscriber identity) present on the UE may be designated (e.g., via user input) as an active or primary subscriber identity. The other(s) of the subscriber identities may be disabled in response to selection of one of the subscriber identities as the active/primary subscriber identity. If desired, forwarding of incoming calls or other traffic directed to the disabled subscriber identity or identities to the active subscriber identity may be configured. Thus in some cases, the UE might be able to receive services (such as incoming calls and/or other messages/traffic) directed to a disabled subscriber identity via an active subscriber identity. This may be possible either when the subscriber identities correspond to different carriers or when the subscriber identities correspond to the same carrier.

Forwarding of cellular services may also be configured for various other scenarios, if desired. For example, if a cellular link between the UE and one of the cellular networks deteriorates significantly, it may be determined that service via that network using a corresponding subscriber identity is unavailable. Forwarding of services which are directed to the subscriber identity for which service is unavailable to another network (e.g., using a subscriber identity corresponding to that network) might be desirable in such a case. Service forwarding between subscriber identities may be configured by a user (e.g., user input to a user interface may be received), for example in order to activate or deactivate such a feature and/or to indicate preferences (such as which services are to be forwarded) relating to service forwarding. Alternatively (or in addition, e.g., as a default option until user configuration occurs), service forwarding between subscriber identities may be automatically configured by the UE, for example in response to detecting that the UE includes multiple subscriber identities.

Note further that the method of FIG. 6 may, at least in some cases, be extended to generate as many eSIMs from removable SIMs as desired, and subsequently to communicate using subscriber identities provided thereby. Similar user interface options (e.g., a prompt or other user interface option inquiring whether or not to generate an eSIM from a removable SIM card) as described above with respect to the first removable SIM card and the first eSIM could be provided each time a removable SIM card is inserted into the UE. For example, if desired, user input requesting that a second eSIM be generated from the second removable SIM card could be received, and a second eSIM could be generated and stored on the UE based on the second removable SIM card based on the user input. Monitoring the second network and performing communications using the second subscriber identity could in such a case be performed using the second eSIM, even if the second removable SIM were removed (de-coupled) from the UE, similarly as described hereinabove with respect to the first eSIM.

Note that over-the-air SIM updates may be slightly complicated for a UE which includes multiple SIMs, as it may be important to ensure that a SIM update is applied to the appropriate SIM. However, this may generally be achieved by identifying the network from which an update comes, and applying the update to the SIM corresponding to that network.

By providing a way for a UE to generate and utilize an eSIM from a removable SIM card (and possibly further to generate and utilize multiple eSIMs, e.g., from multiple removable SIM cards), the flexibility and functionality of the UE with respect to subscriber identity options may be greatly increased.

Such added flexibility and functionality may be of even greater benefit when combined with techniques for simultaneous or concurrent use of multiple subscriber identities, such as the method illustrated and described hereinbelow with respect to FIG. 7. For example, the increased flexibility and more diverse possibilities for subscriber identity combinations enabled by generation of eSIMs from removable SIM cards may increase the range of scenarios in which a user may be able to take advantage of techniques for simultaneous or concurrent use of multiple subscriber identities. However, as noted above, the method of FIG. 6 can be used and may be of benefit even when implemented independently of the method of FIG. 7; similarly, while the method of FIG. 7 may advantageously be implemented in combination with the method of FIG. 6, numerous benefits may derive from the method of FIG. 7 even if a different technique for providing multiple SIMs in a UE is utilized.

As shown in FIG. 7, in 702 cellular communications may be performed with a first cellular network using a first subscriber identity provided by a first SIM. If the method of FIG. 7 is implemented in combination with the method of FIG. 6, the first SIM may be the first eSIM generated from the first removable SIM and described hereinabove with respect to FIG. 6. Alternatively, the first SIM may be an eSIM acquired in another way (e.g., provisioned over-the-air via cellular communication and/or via a wired or other wireless coupling, pre-installed as an embedded eUICC in the UE, etc.), or may be provided from a removable SIM.

In 704, cellular communications may be performed with a second cellular network using a second subscriber identity provided by a second SIM. If the method of FIG. 7 is implemented in combination with the method of FIG. 6, the second SIM may be the second removable SIM card described hereinabove with respect to FIG. 6. Alternatively, the second SIM may be provided by way of any of a number of other ways; for example, the second SIM might be an eSIM also generated from a removable SIM (such as the second removable SIM card described hereinabove with respect to the method of FIG. 6) or acquired in another way (e.g., provisioned over-the-air via cellular communication and/or via a wired or other wireless coupling, pre-installed as an embedded eUICC in the UE, etc.). Further possibilities might include the first SIM and the second SIM being provided from the same removable SIM card (e.g., a multi-SIM card), or the first SIM being provided via a first removable SIM card which is inserted into a first SIM slot while the second SIM is provided via a second removable SIM card which is inserted into a second SIM slot of the UE. Thus in general, the first SIM and the second SIM may be provided to (included or coupled to) the UE in any of a variety of ways.

Note that the first cellular network and the second cellular network may be the same network or different networks. Furthermore, the first cellular network and the second cellular network may operate according to different radio access technologies (RATs). For example, one cellular network might operate according to LTE, while the other cellular network might operate according to GSM. As another possibility, one cellular network might operate according to LTE, while the other cellular network might operate according to CDMA 2000 1 xRTT. Still further, note that the first cellular network and the second cellular network may be operated by the same or different carriers (cellular service providers); thus, the first subscriber identity may configured for use with a first carrier's network, while the second subscriber identity may be configured for use with a second carrier's network, or may also be configured for use with the first carrier's network. In some cases, a carrier might operate multiple networks; for example, in keeping with the previous example of one network operating according to LTE and the other operating according to GSM, both networks could be operated by the same carrier. In this case, the first subscriber identity might be configured for use with the carrier's LTE network while the second subscriber identity might be configured for use with the carrier's GSM network. As an extension or alternative to this possibility, it may be possible that the UE may utilize the different subscriber identities to convey different types of traffic. For example, the first subscriber identity might be used with the LTE network to convey wireless data communications, while the second subscriber identity might be used with the GSM network to convey wireless voice communications. Any of a variety of other configurations (e.g., utilizing different RATs, traffic types, carriers, etc.) are also possible.

The cellular communications with the first cellular network and the second cellular network may be performed concurrently using shared radio resources. As one possibility, this may be accomplished using shared radio resources. For example, the UE might include one antenna, which might be dynamically/adaptively multiplexed between the first subscriber identity and the second subscriber identity, e.g., depending on any of various considerations.

As another example, the UE might include multiple antennas, which might similarly be dynamically/adaptively multiplexed between the first subscriber identity and the second subscriber identity. Thus for a UE with two antennas, at any given time, none (e.g., zero antennas), some (e.g., 1 antenna), or all (e.g., 2 antennas) of the shared radio resources might be provided for communication with the first network using the first subscriber identity, while all (e.g., 2 antennas), some (e.g., 1 antenna), or none (e.g., zero antennas) of those shared radio resources might be provided for communication with the second network using the second subscriber identity. At different times, the balance of which resources are provided to which subscriber identity may vary.

Said another way, at a first time, a first antenna might be used to perform cellular communications with the first cellular network using the first subscriber identity while a second antenna is simultaneously used to perform cellular communications with the second cellular network using the second subscriber identity. At a second time, both the first antenna and the second antenna may be used to perform cellular communications with the first cellular network using the first subscriber identity. Then at a third time, both the first antenna and the second antenna may be used to perform cellular communications with the second cellular network using the second subscriber identity.

A radio resource sharing algorithm for controlling which subscriber identity receives control of which shared radio resources at which time may be implemented to facilitate such radio resource multiplexing. The radio resource sharing algorithm may consider any of a variety of factors in determining to which subscriber identity to provide which shared radio resources at any given time. As one possible consideration, paging channel message scheduling corresponding to the first subscriber identity and the second subscriber identity may be considered as a basis for determining to which subscriber identity to provide shared radio resources. For example, certain times (e.g., timeslots in a time division multiplexing system) may be scheduled as paging opportunities for each subscriber identity with their respective cellular network(s). Typically, at least while monitoring a cellular network in an idle mode, such paging opportunities may represent a relatively small proportion of the time, and may be scheduled at regular periodic intervals, such that as long as the paging opportunities for the first subscriber identity and the second subscriber identity do not conflict, the UE may be able to monitor multiple networks' paging channels using a single antenna by alternately providing the antenna for use in monitoring the paging channel for the first subscriber identity and for use in monitoring the paging channel for the second subscriber identity based on assigned paging opportunities (e.g., timeslots) of the first subscriber identity and the second subscriber identity. In the event of a conflict, any of a variety of conflict handling mechanisms may be implemented to determine to which subscriber identity to provide the antenna. If the UE's shared radio resources include multiple antennas, it may be possible to handle such conflicts by providing an antenna to each subscriber identity.

Another consideration might include radio interface conditions between the UE and one or both of the first cellular network or the second cellular network. In particular, it may be possible (and in some cases preferable, e.g., due to power consumption/battery considerations) to monitor and/or convey traffic with a cellular network using a single antenna when the radio interface provides a high-quality link between the UE and the cellular network (e.g., a link with high signal strength and/or low interference). However, if the radio interface provides a low-quality link between the UE and the cellular network (e.g., a link with low signal strength and/or high interference), it may be necessary or at least preferable to utilize multiple antennas (e.g., for receive and/or transmit diversity) for transmission and/or reception between the UE and that cellular network.

A further possible consideration might include relative priorities of traffic types being conveyed via cellular communications with the first cellular network and via cellular communications with the second cellular network. For example, some types of traffic (e.g., voice and/or other real-time communication with low latency requirements) may be designated or considered higher priority, and/or which may have certain quality of service requirements (or at least preferences). Accordingly, shared radio resources might be preferentially provided to a subscriber identity for which high (or higher) priority traffic is being conveyed relative to a subscriber identity for which low (or lower) priority traffic (or no traffic) is being conveyed.

An extension or alternative to such considerations could include utilizing relative priorities of the first subscriber identity and the second subscriber identity. Such priorities could be determined based on an indication by a user, or automatically determined, such as based on different technologies or typical types of traffic (voice/data) conveyed using different subscriber identities. For example, designation of a primary subscriber identity may be advantageous in some radio resource sharing implementations, e.g., if used as part of a conflict handling mechanism. For example, a radio resource sharing algorithm might provide shared resources to the primary subscriber identity on a preferential basis during conflict events, while experiencing poor radio interface conditions, and/or at any of various other times (e.g., depending on the algorithm).

Note that as an alternative to radio resource sharing as a means for simultaneously or concurrently communicating using multiple subscriber identities, the UE may be configured with independent (i.e., not shared) radio resources (e.g., separate antennas and receive/transmit chains) for communicating using multiple different subscriber identities at the same time, if desired. However, there may be significant advantages to sharing radio resources between multiple subscriber identities, including potentially reducing hardware cost (e.g., by eliminating redundant components that might otherwise be duplicated), and increasing resource use efficiency (e.g., by providing the capability to increase (or decrease) resource allocation to a given subscriber identity when more (or less) robust and/or higher (or lower) throughput communications are desired.

Providing the capability to communicate simultaneously or concurrently using multiple subscriber identities, such as described herein, may be advantageous in a variety of situations and for a variety of reasons.

As one example, consider a situation in which the first and second subscriber identities correspond to the same carrier, but one corresponds to (i.e., supports access to a network that operates according to) a first RAT (such as LTE) while the other corresponds to a second RAT (such as GSM). Such an arrangement may be desirable, for example, if the LTE network of the carrier in question provides data communication services but not voice communication services, and the GSM network is used (e.g., primarily or exclusively) to provide voice communication services. If a single subscriber identity were used by the UE in this scenario, the UE would typically monitor just the LTE network. Then, in the event of an incoming voice call, due to coupling of the GSM and LTE networks, the UE might be paged via the LTE network, but would then have to undergo a "circuit-switched fallback" or "CSFB" technique to set up the call. One or both of the indirect paging via LTE and the CSFB technique may result in a significant delay (e.g., multiple seconds) in call setup time, which may be noticeable and frustrating for users. In contrast, by utilizing different subscriber identities for each network, the UE may be able to simultaneously monitor both the GSM and the LTE network. In this case, an incoming call notification (paging message) could be received directly from the GSM network, and circuit-switched fallback delays could be avoided since the UE would already be attached to the GSM network, which would very likely significantly improve (decrease) call setup times. Similar techniques could be used for LTE and UMTS or any of a variety of other combinations of RATs.

As another example, consider a situation in which the first and second subscriber identities correspond to different carriers, whose networks might utilize similar or different RATs. Such an arrangement might be desirable, for example, in order to expand the geographical range (e.g., if the different carriers correspond to different service areas), reduce costs (e.g., by taking advantage of variations in service plans provided by different carriers), and/or to improve the quality of service obtained by the UE (e.g., by taking advantage of variations in signal strength/quality of the first and second network in various locations to obtain the best available signal), among various reasons.

Note that providing simultaneous support for multiple subscriber identities may be advantageous insofar as it may increase the flexibility/functionality of the UE (e.g., by enabling the device to simultaneously support multiple phone numbers) both in the above-described scenarios (same carrier/different RATs, different carriers) and even in a scenario in which the subscriber identities correspond to the same carrier and utilize the same RAT or combination of RATs. Thus, generally, providing simultaneous support for multiple subscriber identities, such as described herein, may be highly desirable.

Figure 8:
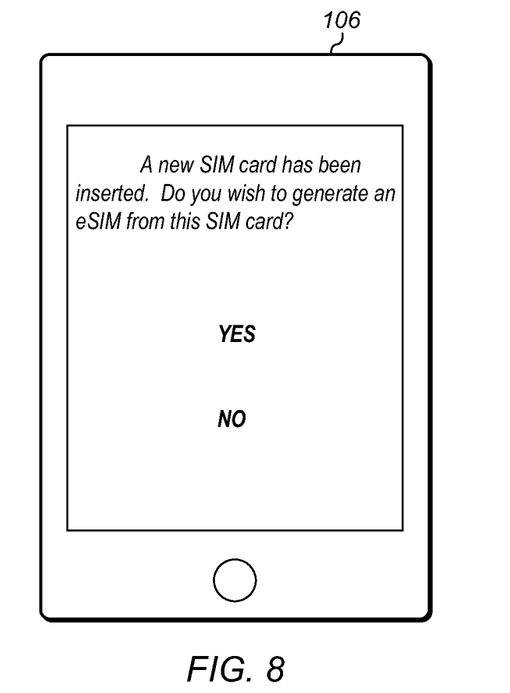
FIG. 8 illustrates a user equipment device providing an exemplary indication of an option to generate an eSIM from a removable SIM card via a user interface.

FIG. 8—Exemplary User Interface Prompt

FIG. 8 illustrates an exemplary user interface prompt which may be provided on a display of a UE 106. It should be noted that the exemplary user interface prompt illustrated in FIG. 8 is provided by way of example of one possible way of providing an indication of an option to generate an eSIM from a removable SIM card to a user of the UE 106 (e.g., in conjunction with the method of FIG. 6), and is not intended to be limiting to the disclosure as a whole. As will be recognized by those skilled in the art, numerous alternate user interface mechanisms/elements and ways of providing indications of available options via those user interface mechanisms/elements are also possible and should be considered within the scope of the present disclosure.

The user interface prompt illustrated in FIG. 8 may prompt a user of the UE 106 as to whether or not it is desired that an eSIM be generated from a removable SIM card which is coupled to the UE 106, and may provide response options of 'YES' or 'NO', as shown. The prompt may be provided in response to the UE 106 detecting that a removable SIM card has been inserted in (or otherwise coupled to) the UE 106.

Note that while the illustrated user interface prompt represents one possible appearance of a user interface by which user input may be received, any number of variations or alternatives are also possible. For example, the prompt might also provide an option for a user to recognize the removable SIM card and to not provide such prompts with respect to that particular SIM card on subsequent occasions. As another possibility, rather than automatically prompting a user as to whether or not it is desired that an eSIM be generated from a removable SIM card which is coupled to the UE 106, the UE 106 might simply make available such options by one or more configuration/settings menus.

Once an option has been selected via the user interface (for example, by receiving user input on a touch screen of the UE 106 at a location on the touch screen corresponding to where the selected option is displayed on the touch screen, or by any other means), the UE 106 may implement the selected option. Note, though, that in some scenarios further options may be available based on the selected option and/or the existing configuration of the UE 106. For example, if the UE 106 already includes one or more SIMs, after responding to the illustrated prompt, a further prompt may be provided requesting designation of one of the SIMs as a primary or active SIM.

Note that it is also possible that one or more subsequent user interface menus may also be provided, for any of a variety of other reasons, as desired.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE), a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising:
an embedded Universal Integrated Circuit Card (eUICC) configured to manage at least a first Subscriber Identity Module (SIM) and a second SIM, wherein the first SIM is associated with a first priority and the second SIM is associated with a second priority different from the first priority;
a radio coupled to at least a first antenna and a second antenna; and
a processor configured to cause the wireless UE device to carry out steps that include:
concurrently performing (1) wireless communications with a first wireless network using the first antenna and the first SIM, and (2) wireless communications with a second wireless network using the second antenna and the second SIM,
when a connection conflict occurs at the radio:
adjusting a level of resources provided to the first SIM and the second SIM in accordance with their respective first and second priorities when performing the wireless communications, and
when a SIM update is received from either the first or the second wireless network:
updating the first SIM in response to identifying that the SIM update corresponds to the first SIM, and
updating the second SIM in response to identifying that the SIM update corresponds to the second SIM.

2. The wireless UE device of claim 1, wherein the connection conflict represents a degradation in a quality of a network connection to the first wireless network and/or a degradation in a quality of a network connection to the second wireless network.

3. The wireless UE device of claim 2, wherein adjusting the level of resources provided to the first SIM comprises:
increasing the level of resources provided to the first SIM, and
utilizing both the first and second antennas to perform the wireless communications.

4. The wireless UE device of claim 1, wherein the first wireless network implements a first radio access technology (RAT) and the second wireless network implements a second RAT that is different from the first RAT.

5. The wireless UE device of claim 1, wherein the first SIM represents a first electronic SIM or a first physical SIM card, and the second SIM represents a second electronic SIM or a second physical SIM card.

6. The wireless UE device of claim 5, wherein:
the first electronic SIM represents a virtualization of the first physical SIM card such that the wireless UE device can operate the first electronic SIM without the first physical SIM card being inserted into the wireless UE device, and
the second electronic SIM represents a virtualization of the second physical SIM card such that the wireless UE device can operate the second electronic SIM without the second physical SIM card being inserted into the wireless UE device.

7. The wireless UE device of claim 1, wherein service via the first wireless network using the first SIM is unavailable due to one or more of:
deterioration of a wireless link between the wireless UE device and the first wireless network, and
the first SIM being disabled within the wireless UE device.

8. A method performed at a wireless user equipment (UE) device, the method comprising:
concurrently performing (1) wireless communications with a first wireless network using a first antenna and a first Subscriber Identity Module (SIM), and (2) wireless communications with a second wireless network using a second antenna and a second SIM, wherein:
the wireless UE device includes:
a radio coupled to at least a first antenna and a second antenna, and
an embedded Universal Integrated Circuit Card (eUICC) configured to manage at least the first SIM and the second SIM, and
the first SIM is associated with a first priority and the second SIM is associated with a second priority different from the first priority;
when a connection conflict occurs at the radio:
adjusting a level of resources provided to the first SIM and the second SIM in accordance with their respective first and second priorities when performing the wireless communications; and
when a SIM update is received from either the first or the second wireless network:
updating the first SIM in response to identifying that the SIM update corresponds to the first SIM, and
updating the second SIM in response to identifying that the SIM update corresponds to the second SIM.

9. The method of claim 8, wherein the connection conflict represents a degradation in a quality of a network connection to the first wireless network and / or a degradation in a quality of a network connection to the second wireless network.

10. The method of claim 9, wherein adjusting the level of resources provided to the first SIM comprises:
increasing the level of resources provided to the first SIM, and
utilizing both the first and second antennas to perform the wireless communications.

11. The method of claim 8, wherein the first wireless network implements a first radio access technology (RAT) and the second wireless network implements a second RAT that is different from the first RAT.

12. The method of claim 8, wherein the first SIM represents a first electronic SIM or a first physical SIM card, and the second SIM represents a second electronic SIM or a second physical SIM card.

13. The method of claim 8, wherein:
the first electronic SIM represents a virtualization of the first physical SIM card such that the wireless UE device can operate the first electronic SIM without the first physical SIM card being inserted into the wireless UE device, and
the second electronic SIM represents a virtualization of the second physical SIM card such that the wireless UE device can operate the second electronic SIM without the second physical SIM card being inserted into the wireless UE device.

14. The method of claim 13, wherein service via the first wireless network using the first SIM is unavailable due to one or more of:
deterioration of a wireless link between the wireless UE device and the first wireless network, and
the first SIM being disabled within the wireless UE device.

15. A non-transitory computer readable storage medium configured to store instructions that, when executed by a processor included in a wireless user equipment (UE) device, cause the wireless UE device to carry out steps that include:
concurrently performing (1) wireless communications with a first wireless network using a first antenna and a first Subscriber Identity Module (SIM), and (2) wireless communications with a second wireless network using a second antenna and a second SIM, wherein:
the wireless UE device includes:
a radio coupled to at least a first antenna and a second antenna, and
an embedded Universal Integrated Circuit Card (eUICC) configured to manage at least the first SIM and the second SIM, and
the first SIM is associated with a first priority and the second SIM is associated with a second priority different from the first priority;
when a connection conflict occurs at the radio:
adjusting a level of resources provided to the first SIM and the second SIM in accordance with their respective first and second priorities when performing the wireless communications; and
when a SIM update is received from either the first or the second wireless network:
updating the first SIM in response to identifying that the SIM update corresponds to the first SIM, and
updating the second SIM in response to identifying that the SIM update corresponds to the second SIM.

16. The non-transitory computer readable storage medium of claim 15, wherein the connection conflict represents a degradation in a quality of a network connection to the first wireless network and/or a degradation in a quality of a network connection to the second wireless network.

17. The non-transitory computer readable storage medium of claim 16, wherein adjusting the level of resources provided to the first SIM comprises:
increasing the level of resources provided to the first SIM, and
utilizing both the first and second antennas to perform the wireless communications.

18. The non-transitory computer readable storage medium of claim 15, wherein the first wireless network implements a first radio access technology (RAT) and the second wireless network implements a second RAT that is different from the first RAT.

19. The non-transitory computer readable storage medium of claim 15, wherein the first SIM represents a first electronic SIM or a first physical SIM card, and the second SIM represents a second electronic SIM or a second physical SIM card.

20. The non-transitory computer readable storage medium of claim 15, wherein:
- the first electronic SIM represents a virtualization of the first physical SIM card such that the wireless UE device can operate the first electronic SIM without the first physical SIM card being inserted into the wireless UE device, and
- the second electronic SIM represents a virtualization of the second physical SIM card such that the wireless UE device can operate the second electronic SIM without the second physical SIM card being inserted into the wireless UE device.

* * * * *